United States Patent
Coe

[15] 3,658,031
[45] Apr. 25, 1972

[54] HOUSING SYSTEM FOR ANIMALS
[72] Inventor: Sherman Michael Coe, Seattle, Wash.
[73] Assignee: Environmental Sciences Corporation, Edmonds, Wash.
[22] Filed: Feb. 13, 1970
[21] Appl. No.: 11,115

[52] U.S. Cl. ............................................. 119/18, 119/22
[51] Int. Cl. ............................... A01k 01/00, A01k 07/00
[58] Field of Search ........................ 119/17, 18, 19, 45, 22

[56] References Cited

UNITED STATES PATENTS

| | | | |
|---|---|---|---|
| 3,269,358 | 8/1966 | Hawley | 119/18 X |
| 3,499,265 | 3/1970 | Sterner | 119/17 |
| 3,476,084 | 11/1969 | Water et al. | 119/17 X |
| 1,508,458 | 9/1924 | Litschgi | 119/17 |
| 2,197,160 | 4/1940 | Schuppner | 119/18 X |
| 3,131,672 | 5/1964 | Mitchell | 119/45 R |

*Primary Examiner*—Hugh R. Chamblee
*Attorney*—Christensen, Sanborn & Matthews

[57] ABSTRACT

An animal housing system having a tier configuration is described. Each tier of the animal housing system is made up of a plurality of divider panels through which substantially parallel wires are threaded to form the bottom of the individual cubicles. The wires forming the bottom are free to rotate to aid in removal of debris from the wires. The back and top of each cubicle are panels which may be solid members or may be formed by parallel wires threaded through the divider panels. A hinged front panel is attached to each cubicle to close the front and provide access to each cubicle individually. An automated watering system provides water drop by drop to the cubicle, eliminating back contamination of the water supply and providing a continuous supply of fresh water accessible to the animals housed in each cubicle. Droppings and debris fall through the bottom wires onto a flush pan, which may be flushed with water on a regular basis. Feed is supplied to the animals through the wires forming the back side of the individual cubicles from a removable feeding trough attached to the back of each tier of cubicles.

6 Claims, 5 Drawing Figures

PATENTED APR 25 1972

INVENTOR
S. MICHAEL COE
BY Christensen, Sanborn
& Matthews
ATTORNEYS

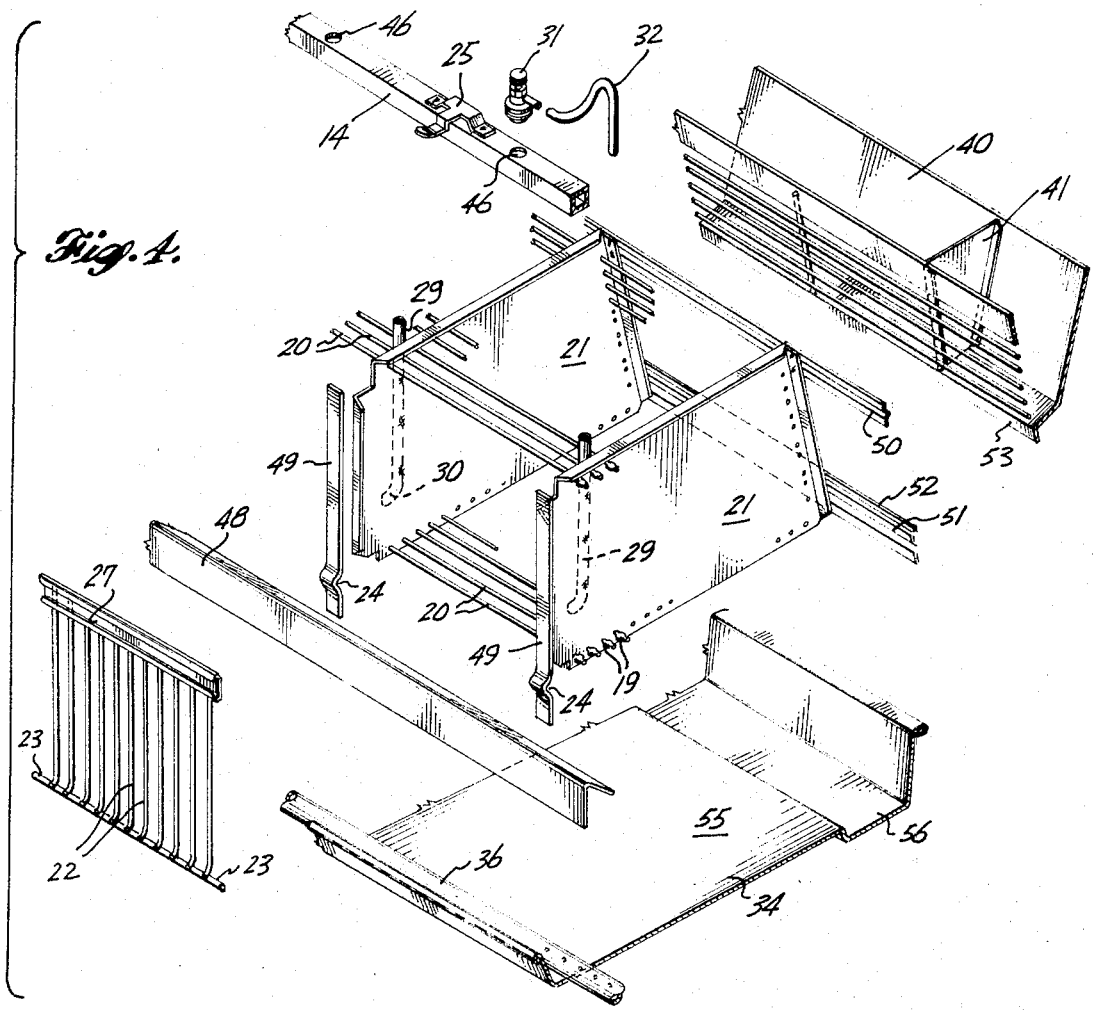
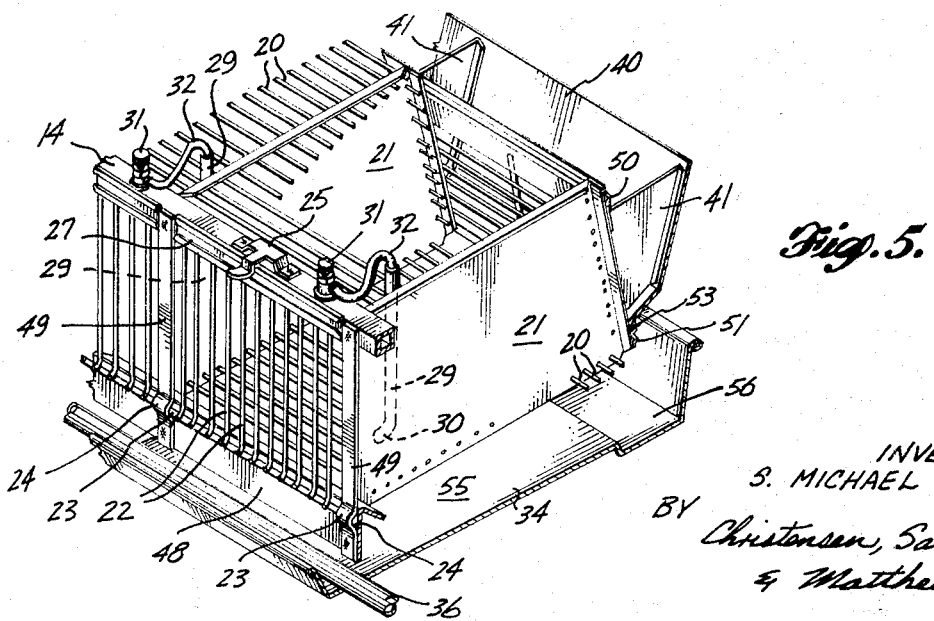

HOUSING SYSTEM FOR ANIMALS

BACKGROUND OF THE INVENTION

This invention relates to animal housing systems and more particularly to the construction thereof to provide a labor-saving means for housing large numbers of all types of animals such as, for example, rats, guinea pigs, dogs, cats, primates, fur-bearing animals, mice and the like which are frequently maintained in large colonies. This invention further relates to housing means for animals having a water supply means, feeding means, and cleaning means, all of which may be partly or fully automated to eliminate the tedious work formerly associated with maintaining a colony of animals. This invention relates in addition to a housing apparatus for animals having a novel and simple construction which is readily adapted to provide improved environmental conditions for large colonies of animals.

PRIOR ART

Many universities, drug and cosmetic firms, private and governmental research facilities and other commercial establishments have need of a means for maintaining a large colony of animals for various purposes in an environment which provides adequate supplies of fresh food, fresh water and reasonably clean and sanitary surroundings for the animals. For research purposes the animal housing system must in addition provide relative isolation between the individual living spaces with a minimum of cross contamination by microorganisms and diseases.

Cages widely used in the industry for housing various types of animals are usually of the type having individual integral cages mounted upon or ganged together on a frame apparatus such that a number of the cages may be advantageously placed in relative proximity to each other. The cages of the prior art are individually constructed and mounted upon a frame apparatus, resulting in an inefficient construction procedure and unnecessary duplication of many elements of the cages. There has long been a need for a cage structure which is easily and efficiently constructed and which eliminates duplication of such parts of the cage structure as the side walls, feeder mechanisms and water supply apparatus.

The apparatus of the prior art, while usually providing an adequate enclosure to cage animals, requires a great deal of individual care for each cage in the feeding, watering and cleaning operations necessary to maintain healthy animals. For example, in the cleaning function known in the prior art, attention to each cage is necessary when droppings and unused feed collect on the intersections of the wires in the wire mesh usually used for the bottom of the cages. These accumulations provide a place for bacteria and other infectious microorganisms to grow, resulting in unsanitary conditions and not infrequently disease of the animals contained in the cages.

The watering supply provided for animal cages known to the prior art usually comprises individual water bottles which must be changed every day to provide reasonably fresh drinking water for the animals. The changing or refilling of the water bottles requires a large amount of labor and there is no visual assurance that the water is in fact changed daily. The water in each bottle is stagnant so that a fresh supply of water is not usually available to the animals. It is also known to provide a float valve type of apparatus to maintain a continuous supply of water to the cage. This type of valving arrangement permits back contamination of the watering system in the event a communicable disease is present. In addition, in the float valve system, there is no visible means to show that the system is in fact working. It may be necessary to check each float daily to be assured of a fresh water supply for each cage. Stagnation can occur in the float valve system if the animal uses only a small amount of water each day.

OBJECTS OF THE INVENTION

It is an object of the present invention to provide an animal housing apparatus formed in tiers which eliminates the problems associated with the animal cages known to the prior art. Another object is to provide an animal housing system which has no locations at which droppings and other refuse may collect to harbor disease.

A further object of this invention is to provide an automated animal housing system which eliminates a great deal of the work previously associated with the care and maintenance of laboratory animals. A specific object related to the automation feature is to provide feeding and watering means for animals enclosed in a housing system which provide without supervision a continuous supply of food and water to the animals for an extended period of time.

A still further object of this invention is to provide housing means for use with experimental animals which will permit large scale experimentation upon laboratory animals with a minimum of maintenance and care and which will substantially eliminate contamination and infection of the animals through the feed and watering apparatus while maintaining the animals in a clean and healthy environment.

One specific object of this invention is to provide means to supply fresh water at all times to each cubicle of the animal housing system. Another specific object is to provide means to remove droppings and debris from the animal housing system which is substantially automatic and virtually labor-free.

SUMMARY OF THE INVENTION

This invention comprises a housing system for animals which is constructed using a series of individual wall dividers, each of which has a series of perforations along the bottom edge. The wall dividers are strung together by use of wires inserted through corresponding perforations. The wall dividers may be spread apart to any suitable dimension to accommodate the particular animal size desired. The wires are crimped at each end to maintain them in their proper location after insertion through the perforations, but are free to rotate therein. Movement of the animals in the cubicles causes the wires to rotate and thus aid in removing any droppings, feed and debris from the wires. This structure provides a construction which is efficient in terms of the materials and labor required to manufacture the unit and which does not permit accumulation of droppings, feed and debris. The back and top of the tiers of cubicles may be constructed of a solid panelling material such as stainless steel or may be constructed in the manner of the bottom of the cage described above in which a plurality of parallel wire elements are inserted through perforations along the peripheral edges of the individual wall dividers. The front of each cubicle is closed by an individual door member which is hinged for access to the cubicle.

A tubular top front frame member is used as a water supply pipe as well as being one of the main structural members supporting each tier of cubicles. The automated watering system used in this invention is designed to provide a constant supply of fresh water into each cubicle, one drop at a time. This system requires no reservoir or holding period nor is there any stagnant water present in the interior of the cubicle which may become contaminated or otherwise non-potable. There is a constant flow of water providing a fresh drop to the animal at any time the animal desires a drink. No moving parts other than a simple throttling valve are necessary to control the flow of water. Any water not ingested by the animals will drop through the wires in the bottom of the cubicle onto a flush pan. This watering system provides a constant supply of water, one drop at a time, in a visible system to show that the system is working and supplying water to the animals housed in the cubicles. Each drop is individually formed in a location which is inaccessible to the animal inside the cubicle. The drops then descend to a location at which the water is accessible for drinking purposes to the animal without contacting the apparatus during its descent, that is, there is no path traversed by the water entering the cubicle through which back contamination of the watering system could occur. The dropwise method of supplying water to the cubicles provides an air gap between the outlet from the water supply and the point of consumption. A virtually contamination-proof system results, permitting the maintenance of a healthy colony of animals even if one of the animals is sick with a communicable disease which may be transmitted by water.

A flush tray is provided beneath each tier of cubicles to catch the water not ingested by the animal. The flush trays function as the automatic cleaning means through the use of a flush water supply pipe mounted at the upper side of the inclined tray. Flush water flows onto the flush tray on a regular basis to carry away droppings and debris. The flush system preferably has the flush water injected at the front of the cage system and washes the urine, fecal matter and other debris from the front to the back of the housing system into a collecting trough. A laminar flow liquid distributor or simply a tubular member having a plurality of perforations therein may be used as the flush water distributor. The laminar flow distributor substantially eliminates the aerosol which may be formed by use of a perforated tubular member or other distributors of the prior art. Flushing from the front to the back of the flush tray prevents contamination of the housing system which may result when the water moves contaminated debris laterally underneath the cuticles. The entire housing system need not be perfectly level for the flush system to work properly.

These and other objects and attributes of the invention will become more readily apparent from a detailed evaluation of the following description of one preferred embodiment with reference to the attached drawings.

IN THE DRAWINGS

FIG. 4 is an exploded view of one cubicle of the housing system of this invention showing the constituent parts thereof; and FIG. 5 is a perspective view of the device shown in FIG. 4 assembled.

Referring more particularly to the drawings wherein like numerals indicate like parts, in FIGS. 1 through 5 a housing system for animals is shown comprising several tiers of cubicles supported on end frames 11 and 12. The drinking water supply pipes 14 are fabricated from square tubing and serve as the main structural support member in the front portion of each tier. An individual water supply line 32 enters each individual cubicle and supplies water on a drop-by-drop basis to the vertical tube 29. The flushing system and flush water supply 16 permit automated cleaning of each individual flush pan on a scheduled flushing basis, with the capability to program any flush schedule desired.

Figure 1:
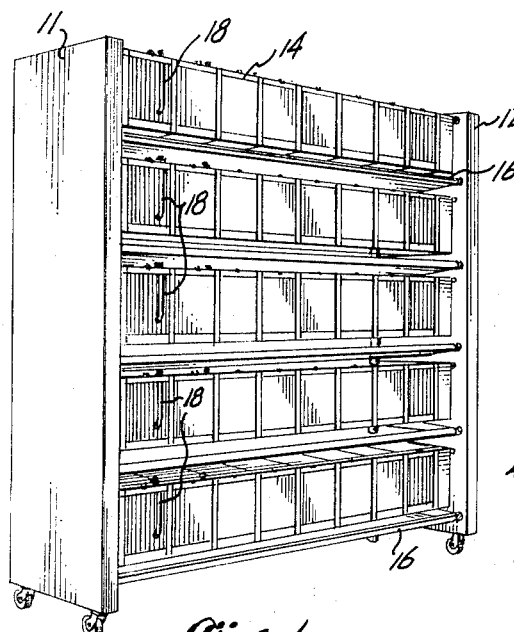
FIG. 1 shows a perspective view of the front of an animal housing system made up of several tiers of cubicles.
Figure 2:
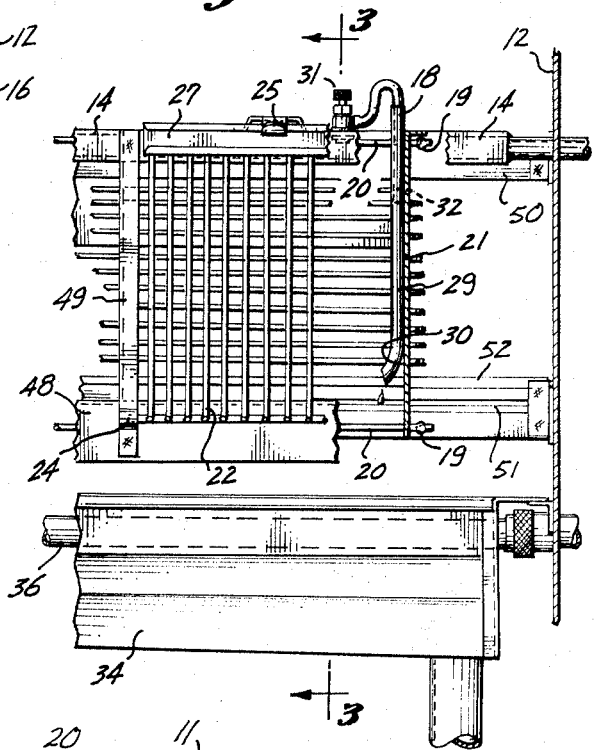
FIG. 2 shows a front view of one cubicle having a portion cut away to show the water supply apparatus provided in each cubicle.

In FIG. 2, an enlarged view of one cubicle shown from the front is presented with frame end wall 12 supporting the tubular drinking water supply pipe 14. Wires 20 define the bottom, rear and top of the cubicle. A front panel 22 is hinged for rotation about hinge 24. The drinking water supply 18 comprises a vertical tube 29 which is turned inwardly toward the center of the cubicle at its bottom to provide a drop-by-drop supply of water to the animal in the cubicle. Water under pressure is supplied to pipeline 14 and the water flow into vertical pipe 29 is controlled by the setting of valve 31. The vertical pipe 29 is of sufficient diameter to permit insertion of the supply tube 32. Individual droplets of water issue from supply tube 32 and fall downwardly through vertical tube 29. The end of supply tube 32 may be constricted if desired to ensure dropwise introduction of the water to the vertical tube 29. The water which enters vertical tube 29 flows downwardly to the bottom end 30 and is accessible to the animal in the cubicle at that point. Water not consumed by the animal will pass out of tube 29 and fall through the wires 20 forming the bottom of the cubicle to the flush pan 34.

Figure 3:
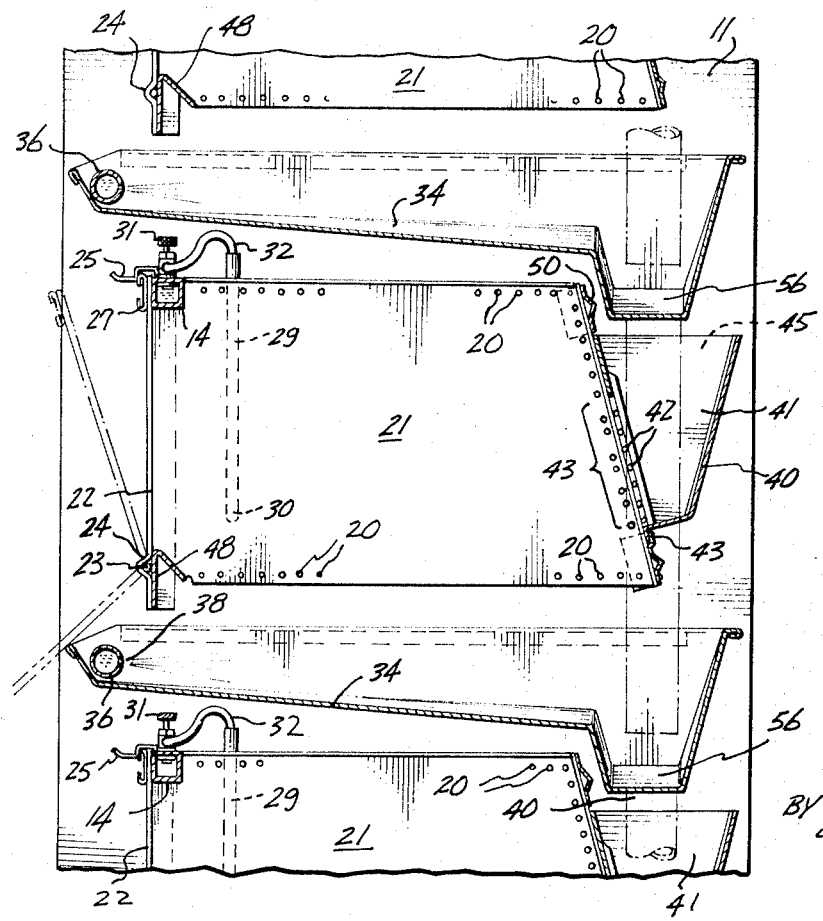
FIG. 3 is a cross section taken along line 3—3 of FIG. 2 showing the construction features of the housing system of this invention.

In FIG. 3 a cross section of one cubicle is shown. This cross section was taken along lines 3—3 of FIG. 2 showing the relationship between the tiers of cubicles and the automatic cleaning system. The flush pan 34 is located beneath each cubicle and extends the full length of the tier of cubicles. A flush water pipe 36 having a plurality of water flush apertures 38 is shown at the upper end of the slanted bottom of flush pan 34. At the other end of flush pan 34 is the trough 56 having drain 40 which removes the flush water carrying droppings and debris from the system. The wires 20 are inserted through perforations in the side wall members 21 and are constructed and arranged in the housing system so that movement of the animals in the cubicles will cause the wires to rotate in the perforations to aid in removing droppings and debris therefrom.

The structural member 14 acts both as a structural support means for the front of the tier of cubicles and to supply water to the cubicles for drinking purposes. Needle valve 31 controls the rate of flow of the water through water supply tube 32 into the vertical tube 29 which in turn supplies drinking water on a drop-by-drop basis to the animal caged in the cubicle. Use of needle valves or any other type of throttling valves which can be used to control the water flow provides greater flexibility for the animal housing system in that the flow of drinking water to one individual cubicle may be interrupted without affecting the water flow to the other cubicles in the housing system. The feature of individual control of the watering apparatus to each cubicle allows for the addition of special water diets or other types of liquid diets to a given animal in a particular cubicle without affecting the water supply to the other cubicles in the housing system.

The hinged front 22 of the cubicle rotates on axles 23 about hinge point 24 to provide access to the cubicle. A latch means 25 is provided to hold the cubicle front in its closed position. A name plate slot 27 is provided to aid in identification of the animal caged in the cubicle.

The food supply for the animal's use is contained in feeder 40 which comprises a food trough for holding pellet sized food materials. The trough has a solid wall 41 on the outer side and a plurality of wire strung along the inner side which permits access to the food. The corresponding wires forming the back portion 43 of the cubicle are spaced to permit the animal to readily reach the food contained in feeder 40. Feeder 40 is hinged at the bottom about point 44 and may be attached at the top by a spring or clip type latch or other suitable means. The feeder trough 40 may be rotated outwardly to permit easy access for filling and maintenance.

In FIG. 4 the elements which make up the cubicles are shown in an exploded view to indicate the method of assembly and fabrication of each tier of cubicles. Wires 20 are threaded through perforations located around the periphery of each divider panel 21. The wires 20 are crimped at the end of each tier after being threaded through perforations in each divider panel. This configuration permits free rotation of each individual wire to facilitate the automatic cleaning thereof by movement of the animal in the cubicle. Valve 31 is connected into water supply pipeline 14 through aperture 46 to provide a water supply for drinking purposes to the cubicle. The front lower frame 48 is attached to each divider panel 21 at the front bottom corner thereof and serves to provide support to and properly space the divider panels of each cubicle. The front support strips 49 are attached to the lower front frame member 48, the divider panels 21 and the water supply pipe 14 to orient the front portion of the cubicle and provide a pivot point 24 for the pivotally mounted front gate 22. The front gate 22 engages pivot points 24 with axles 23 and permits access to the cubicle when desired. Latch 25 serves to hold the front gate 22 securely in the closed position.

The upper rear frame member 50 and the lower rear frame member 51 are each securely attached to the cubicle divider panels 21 to aid in positioning and supporting the divider panels. The upper lip 52 of the lower rear frame member is angled out from divider panels 21 to provide means to engage and support the lower lip portion 53 of feeder 40. Feeder 40 is releasably held in position by spring 45, providing access to the feed contained therein.

Beneath each tier a dropping and flush pan is disposed having an inclined surface 55 and a trough member 56. Droppings and other debris are caught by the inclined surface 55 and may be flushed therefrom by water flowing across the inclined surface 55 from the flush water supply pipe 36. In the preferred embodiment as shown in the attached drawings, the flush water is supplied on a timed basis to each individual tier on a predetermined time cycle. For example, the water may be supplied to the top tier first and run for a period of 30 seconds. After a time delay of about 3 minutes the water flow is initiated to the second tier. This process continues downwardly, each tier in turn, until all have been flushed. The process is then repeated on a continuous timed sequence. Thus, in an animal housing system having five tiers of cubicles, each flush pan is washed with the flush water once every 15 to 20 minutes. Both the time cycle and the duration of the wash on each pan may, of course, be varied to meet any specific requirements found to be necessary in the use and operation of the animal housing system described in this invention. Factors such as the species of the animal, hardness of the water, pressure of the water, amount of debris to be removed and other similar aspects may be taken into consideration in determining the length and frequency of the wash cycle on each pan.

The unique automatic drinking water supply system provided by this invention is constructed as an integral part of the animal housing system design. This automatic watering system may be provided with adjustable valves to regulate the pressure supplied to each tier of cubicles as well as the needle valves necessary to regulate the water flow in each cubicle. In supplying water to the individual cubicles, the watering system provides five functional features to answer the needs of the industry. These features include an automatic watering system in which it is visibly evident that the system is operating properly; a virtually contamination-proof watering system; complete control of the water to each cubicle so that the system may be completely turned off in any cubicle without affecting the supply to any other cubicle; providing a fresh drop of water each time the animal seeks to take a drink; and providing a system giving additional versatility in the feeding and watering such that individual diets may be automatically administered to the animals. This watering system saves the operator a great deal of time and labor in that the flow of water is readily visible.

The unique design of the animal housing system described above permits assembly of each tier of the caging system in a very efficient and rapid manner. A smaller amount of construction materials and a great deal less labor are necessary to assembly and finish the complete multi-tiered animal housing system. Each tier is put together utilizing several individual divider panels 21 which form the wall members separating the individual cubicles. The divider panels 21 are strung together by a series of wires 20 which are passed through corresponding perforations in each of the individual divider panels. The divider panels may be spread to any dimension, resulting in a cubicle having the proper volume to handle the particular type of animal to be housed therein. The back and top of the cubicle as well as the bottom may be constructed of the wires which are threaded through the perforations in the individual wall panels. Alternately, solid panels may be used. Each wire is crimped at each end to hold it in place but permit rotation of the wire within its perforations to aid in cleaning debris from the wire. This type of cubicle construction provides for completely clean housing of animals, eliminating accumulations particularly noticeable around the floor of prior art cages.

The animal housing system is preferably constructed of stainless steel because of the obvious advantages of cleanliness, appearance and relative ease of fabrication. Any metal, wood or plastic material having characteristics permitting substitution for the stainless steel may be used in place of the stainless steel provided in the preferred embodiment. For example, the divider panel could be constructed of plastic or wood sheet material instead of metal. A glass or plastic panel could be used to form the pivotally mounted front section of each cubicle. Plastic tubing would be suitable for use both as the drinking water supply apparatus and as the flush water supply means.

The invention described above thus provides a caging means which eliminates nearly all of the labor previously necessary for maintaining animals under laboratory conditions. The invention provides for an automated cleaning system to remove droppings, spilled feed, and debris; a separate automatic watering system for drinking water which provides fresh water to the animal at all times, and which eliminates the problems of back contamination of the drinking water distribution system. The animal housing system also provides means to supply feed to the animals for an extended period without interruption. The housing system has a simple design that is self-cleaning and which prevents the accumulation of droppings and other odor and disease-producing debris. The individual cubicles are clean and well ventilated with a large, hinged front gate which facilitates access to the cubicle for introducing or removing an animal. These features combine to provide an animal housing system which requires much less labor and substantially decreases the transmission of disease between the cubicles and through the water distribution system.

I claim as my invention:

1. An animal housing system having at least one tier of cubicles, each tier comprising:
    a plurality of divider panel elements having perforations spaced along at least the bottom peripheral edge thereof;
    rotatable elongated structural members threaded through corresponding perforations in each of said plurality of divider panel elements;
    frame means spacing and supporting said divider panel elements said frame means including a substantially horizontally disposed tubular water supply means supporting each tier of cubicles, said supply means having distribution means thereon to individually supply drinking water to each of said cubicles; and
    an inclined surface disposed beneath said cubicles adapted to catch debris from said cubicles and provided with flush water supply means for removal of said debris.

2. The apparatus of claim 1 having a plurality of elongated structural members threaded through corresponding perforations along the back of each of said divider panel elements to form the back of said cubicle.

3. The apparatus of claim 1 having a pivotally attached closure member engaging the front of each cubicle to provide convenient access to the interior of said cubicle.

4. The apparatus of claim 1 wherein said inclined surface provides for water flow from said flushing means from the front of said cubicle to the rear of said cubicle, said flushing means being mounted at the upper end of said inclined surface.

5. The apparatus of claim 1 wherein said flushing means is constructed and arranged to provide a liquid flowing in laminar flow across the face of said inclined surface.

6. The apparatus of claim 1 wherein said distribution means comprises:
    valve means communicating with said tubular water supply means to control the flow of water from said tubular water supply means to each cubicle;
    water conduit means constructed and arranged to conduct water from said valve means to said cubicle and to form individual droplets of water at the terminal end thereof; and vertically oriented tube means mounted inside each cubicle defining a closed path for the unimpeded descent of said water droplets inaccessable to animals housed in said cubicle and having means at the lower end thereof to interrupt the descent of said droplets permitting consumption thereof by the animals housed in said cubicle without presenting a path for back-contamination of said distribution means by microorganisms from any of said cubicles.

* * * * *